United States Patent
Choi et al.

(10) Patent No.: US 11,428,433 B2
(45) Date of Patent: Aug. 30, 2022

(54) AIR CONDITIONER AND METHOD FOR CONTROLLING THE SAME

(71) Applicant: LG ELECTRONICS INC., Seoul (KR)

(72) Inventors: Jae Heuk Choi, Seoul (KR); Juyoun Lee, Seoul (KR); Jeonghoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/991,365

(22) Filed: Aug. 12, 2020

(65) Prior Publication Data
US 2021/0247093 A1 Aug. 12, 2021

(30) Foreign Application Priority Data
Feb. 6, 2020 (KR) .................... 10-2020-0014228

(51) Int. Cl.
*F24F 11/64* (2018.01)
*F24F 11/65* (2018.01)
(Continued)

(52) U.S. Cl.
CPC ............ *F24F 11/64* (2018.01); *F24F 11/65* (2018.01); *G05B 19/042* (2013.01); *F24F 11/56* (2018.01);
(Continued)

(58) Field of Classification Search
CPC .. F24F 11/64; F24F 11/65; F24F 11/56; F24F 2110/12; F24F 2110/00; F24F 2110/30;
(Continued)

(56) References Cited

U.S. PATENT DOCUMENTS 5,762,265 A * 6/1998 Kitamura ........... G05D 23/1917
236/51
9,588,506 B1 * 3/2017 Clayton ................ G05B 15/02
(Continued)

FOREIGN PATENT DOCUMENTS

JP 06-137639 5/1994
JP H 06-323604 11/1994
(Continued)

OTHER PUBLICATIONS

International Search Report issued in Application No. PCT/KR2020/018221 dated Mar. 25, 2021.
(Continued)

*Primary Examiner* — Jigneshkumar C Patel
(74) *Attorney, Agent, or Firm* — Ked & Associates LLP

(57) ABSTRACT

An air conditioner and a control method thereof are provided. The air conditioner includes a sensor portion including at least one sensor, a controller including at least one control portion to control a function of the air conditioner, and at least one processor operatively connected to the sensor and the controller. The at least one processor is configured to obtain an airflow speed and indoor environmental data by the sensor portion while the air conditioner is operating, generate a first algorithm by applying the obtained airflow speed, the indoor environmental data, and pre-stored reference data to a second algorithm, and control operation of the air conditioner based on the generated first algorithm.

20 Claims, 16 Drawing Sheets

(51) Int. Cl.
*F24F 11/56* (2018.01)
*G05B 19/042* (2006.01)
*F24F 110/20* (2018.01)
*F24F 110/22* (2018.01)
*F24F 110/30* (2018.01)
*F24F 110/00* (2018.01)
*F24F 110/10* (2018.01)
*F24F 110/12* (2018.01)

(52) U.S. Cl.
CPC ....... *F24F 2110/00* (2018.01); *F24F 2110/10* (2018.01); *F24F 2110/12* (2018.01); *F24F 2110/20* (2018.01); *F24F 2110/22* (2018.01); *F24F 2110/30* (2018.01); *G05B 2219/2614* (2013.01)

(58) Field of Classification Search
CPC ............... F24F 2110/10; F24F 2110/22; F24F 2110/20; G05B 19/042; G05B 2219/2614
USPC ........................................................ 700/276
See application file for complete search history.

(56) References Cited

U.S. PATENT DOCUMENTS

| | | | |
|---|---|---|---|
| 2004/0079094 A1 | 4/2004 | Kasai et al. | |
| 2007/0240437 A1* | 10/2007 | Yonezawa | F24F 11/30 62/176.1 |
| 2016/0363340 A1 | 12/2016 | Shikii et al. | |
| 2018/0100662 A1 | 4/2018 | Farahmand et al. | |
| 2018/0283723 A1 | 10/2018 | Ock et al. | |
| 2019/0309970 A1 | 10/2019 | Park et al. | |
| 2020/0037416 A1* | 1/2020 | Oobayashi | H05B 47/155 |

FOREIGN PATENT DOCUMENTS

| | | |
|---|---|---|
| JP | 2755031 | 3/1998 |
| JP | 3448471 | 7/2003 |
| JP | 2004-150731 | 5/2004 |
| JP | 3807305 | 8/2006 |
| JP | 3990431 | 7/2007 |
| JP | 4286118 | 4/2009 |
| JP | 2010-270919 | 12/2010 |
| JP | 5313031 | 7/2013 |
| JP | 2015-025631 | 2/2015 |
| KR | 10-0248763 | 4/2000 |
| KR | 10-2005-0018889 | 2/2005 |
| KR | 10-1102689 | 1/2012 |
| KR | 10-2015-0015886 | 2/2015 |
| KR | 10-1757446 | 7/2017 |
| KR | 10-2018-0112653 | 10/2018 |
| KR | 10-2019-0091231 | 8/2019 |
| KR | 10-2019-0106608 | 9/2019 |
| WO | WO 2019/182970 | 9/2019 |

OTHER PUBLICATIONS

European Search Report issued in Application No. 21155050.4 dated Jun. 18, 2021.

* cited by examiner

AIR CONDITIONER AND METHOD FOR CONTROLLING THE SAME

CROSS-REFERENCE TO RELATED APPLICATION

This application claims priority to and the benefit of Korean Patent Application No. 10-2020-0014228, filed on Feb. 6, 2020, the disclosure of which is incorporated herein by reference in its entirety.

BACKGROUND

1. Field of the Disclosure

The present disclosure relates to an air conditioner and a control method thereof.

2. Description of Related Art

Examples of air conditioners may include stand-type air conditioners, wall-type conditioners, and ceiling-type air conditioners. The air conditioner may include a value and a refrigeration cycle device and may control a wind direction using the vane and may perform cooling/heating using the refrigeration cycle device. The air conditioner may supply air to an indoor space based on a user set temperature and automatic rotation of the vane.

An air conditioner may provide air to the indoor space based on the user set temperature or user set humidity. The air conditioners may lower the indoor temperature and the indoor humidity to provide user comfort.

The air conditioners in related art may operate using an algorithm in related art (e.g., a predicted mean vote (PMV)). The PMV is an algorithm easily representing a predicted warm and cold sensation, a warming index, a predicted mean warm sensation, a predicted warm sensation response, a predicted mean vote, and a mean preheating temperature value within numerical values of −3 to +3. People may feel warm and cold sensation based on the PMV.

In some examples, the air conditioner in the related art operated based on the PMV may not reflect an influence of airflow, thereby blocking an optimal user comfort.

In addition, even if the air conditioner operates based on the user set conditions, the user may feel different comfort.

In addition, the PMV may not reflect the airflow and has been used for the air conditioner since about 1982. Therefore, the air conditioner may be difficult to perform various functions based on the PMV.

Therefore, there is a need for a new algorithm to improve comfort by reflecting the influence of the airflow to provide a user with better comfort based on the new algorithm.

SUMMARY OF THE DISCLOSURE

The present disclosure provides an air conditioner to improve user comfort and a method for controlling the air conditioner.

The present disclosure also provides a new algorithm to further improve the user comfort.

The present disclosure further provides an air conditioner using a new algorithm and a method for operating the air conditioner based on the new algorithm.

The present disclosure further provides an air conditioner to provide an optimal user comfort based on indoor environmental data on indoor space where an indoor unit is located and outdoor environmental data on outdoor space where an outdoor unit is located.

The objects of the present disclosure are not limited to the above-mentioned objects, and other objects and advantages of the present disclosure which are not mentioned may be understood by the following description and more clearly understood based on the embodiments of the present disclosure. It will also be readily understood that the objects and the advantages of the present disclosure may be implemented by features defined in claims and a combination thereof.

According to the present disclosure, the indoor unit of the air conditioner may obtain indoor environmental data by using at least one sensor and the outdoor unit of the air conditioner may obtain outdoor environmental data by using at least one sensor.

According to the present disclosure, the air conditioner may also generate a new algorithm to provide improved user comfort based on the indoor environmental data obtained by the indoor unit, the outdoor environmental data obtained by the outdoor unit, and pre-stored reference data.

In addition, according to the present disclosure, the air conditioner may control a temperature, humidity, or an air volume of the air conditioner based on a control signal for at least one of the temperature, the humidity, or the wind volume to minimize a difference between a value of a first parameter of the environmental data currently measured in the indoor space where the user is located and a value of a second parameter in the new algorithm.

According to an embodiment of the present disclosure, an air conditioner may include a sensor portion configured to include at least one sensor, a controller configured to include at least one control portion to control a function of the air conditioner, and at least one processor operatively connected to the sensor portion and the controller. The at least one processor may be configured to obtain an airflow speed and indoor environmental data by using the sensor portion while the air conditioner is operating, generate a second algorithm by applying the obtained airflow speed, the indoor environmental data, and pre-stored reference data to a first algorithm, and control operation of the air conditioner based on the generated second algorithm.

In addition, according to an embodiment of the present disclosure, a control device of the air conditioner may include a sensor portion configured to include at least one sensor, a controller configured to include at least one control portion to control a function of the air conditioner, at least one processor, and a memory operatively connected to the sensor portion, the controller, and the at least one processor. The memory may be configured to store instructions that, when executed by the at least one processor, cause the apparatus to perform operations including: obtaining an airflow speed and indoor environmental data by the sensor portion while the air conditioner is operating, generating a second algorithm by applying the obtained airflow speed, the indoor environmental data, and pre-stored reference data to a first algorithm, and controlling operation of the air conditioner stored based on the generated second algorithm.

In addition, according to an embodiment of the present disclosure, a method for controlling an air conditioner may include obtaining, by a sensor portion, an airflow speed and indoor environmental data while the air conditioner is operating, generating a second algorithm by applying the obtained airflow speed, the indoor environmental data, and reference data pre-stored in the storage to a first algorithm, and controlling the air conditioner based on the generated second algorithm.

The present disclosure may provide an air conditioner to improve user comfort and a method for controlling the air conditioner, thereby further improving the user comfort.

In addition, according to the present disclosure, a new algorithm may be generated to further improve the user comfort and the generated new algorithm may be applied to an air conditioner to provide user convenience.

In addition, the air conditioner of the present disclosure may obtain indoor environmental data from an indoor unit and outdoor environmental data from an outdoor unit to provide an environment that satisfies the comfort needed by a user.

In addition, according to the present disclosure, the air conditioner may be operated based on indoor environmental data obtained by the indoor unit, outdoor environmental data obtained by the outdoor unit, and pre-stored reference data to provide optimal comfort to users.

Hereafter, further effects of the present disclosure, in addition to the above-mentioned effect, is described together while describing specific matters for implementing the present disclosure.

DETAILED DESCRIPTION OF EXEMPLARY IMPLEMENTATIONS

Figure 1:
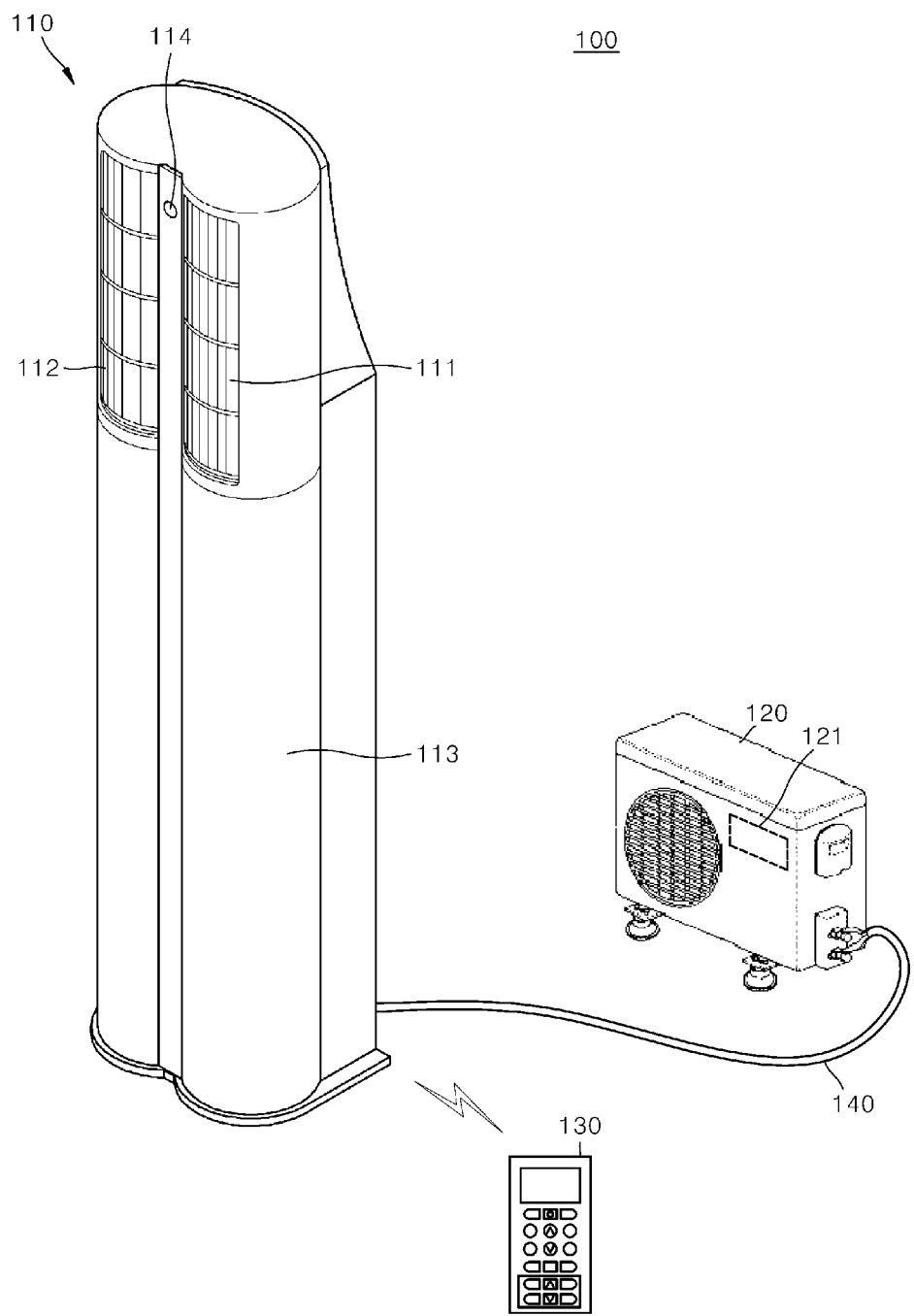
FIG. 1 is an exemplary diagram showing an example air conditioner.

Some embodiments of the present disclosure will be described in detail with reference to the accompanying drawings, such that those skilled in the art to which the present disclosure pertains may easily implement the technical idea of the present disclosure. In the description of the present disclosure, a detailed description of the known technology relating to the present disclosure may be omitted if it unnecessarily obscures the gist of the present disclosure. Hereinafter, one or more embodiments of the present disclosure will be described in detail with reference to the accompanying drawings. Same reference numerals may be used to refer to same or similar component in the figures.

In some examples, terms such as first, second, and the like may be used herein when describing elements of the present disclosure, but the elements are not limited to those terms. These terms are intended to distinguish one element from other elements, and the first element may be a second element unless otherwise stated.

In this document, the terms "upper," "lower," "on," "under," or the like are used such that, where a first component is arranged at "an upper portion" or "a lower portion" of a second component, the first component may be arranged in contact with the upper surface (or the lower surface) of the second component, or another component may be disposed between the first component and the second component. Similarly, where a first component is arranged on or under a second component, the first component may be arranged directly on or under (in contact with) the second component, or one or more other components may be disposed between the first component and the second component.

Further, the terms "connected," "coupled," or the like are used such that, where a first component is connected or coupled to a second component, the first component may be directly connected or able to be connected to the second component, or one or more additional components may be disposed between the first and second components, or the first and second components may be connected or coupled through one or more additional components.

Unless otherwise stated, each component may be singular or plural throughout the disclosure.

As used herein, the singular forms "a," "an" and "the" are intended to include the plural forms as well, unless the context clearly indicates otherwise. In the present disclosure, it should not be construed that terms such as "including" or "comprising" necessarily include various types of components or various steps described in the present disclosure, and it should be construed terms such as "including" or "comprising" do not include some components or some steps or may include additional components or steps.

In the present disclosure, unless otherwise stated, "A and/or B" means A, B or A and B. Unless otherwise stated, "C to D" means "C or more and D or less".

Hereinafter, an air conditioner and a method for controlling the air conditioner according to some embodiments of the present disclosure are described below.

Figure 2A:
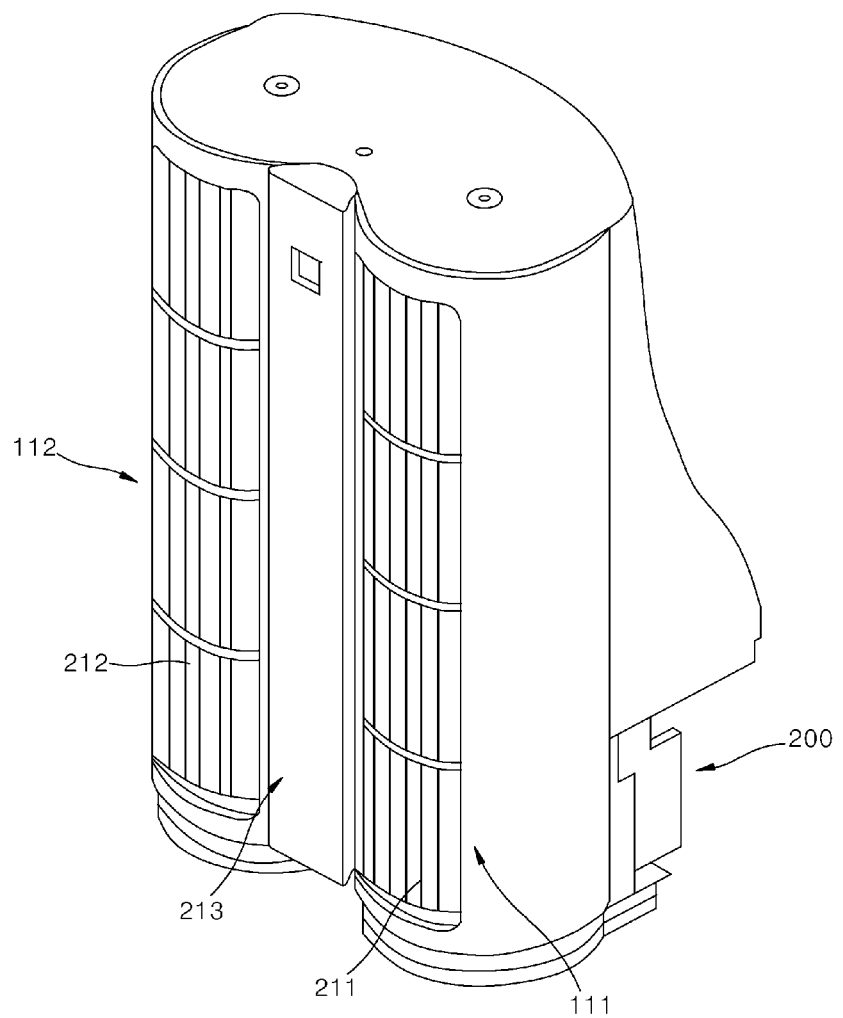
FIG. 2A is an exemplary diagram showing a discharger of an indoor unit to discharge air.
Figure 2B:
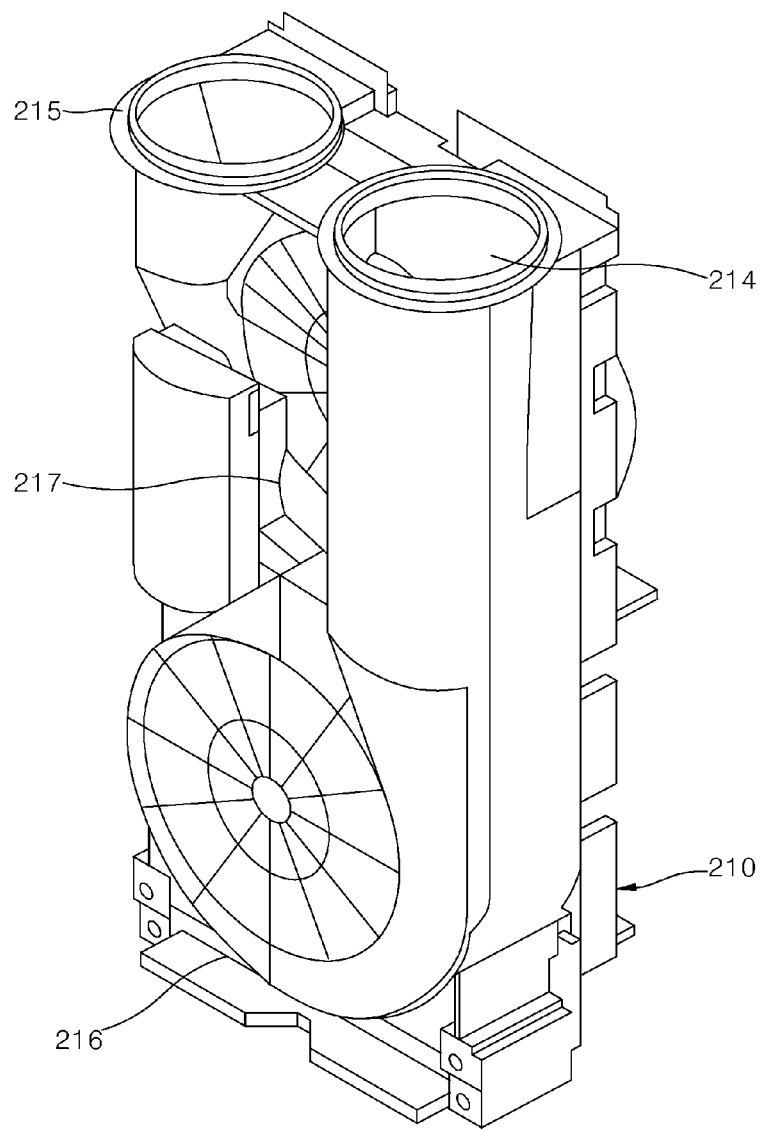
FIG. 2B is an exemplary diagram showing an example blower of an indoor unit to blow air by inhaling air.

FIG. 1 is an exemplary diagram showing an example air conditioner. FIG. 2a is an exemplary diagram showing an example discharger of an indoor unit configured to discharge air. FIG. 2B is an exemplary diagram showing an example blower of an indoor unit configured to blow air by inhaling air.

Referring to FIGS. 1, 2A and 2B, according to an embodiment of the present disclosure, an air conditioner 100 may include an indoor unit 110, an outdoor unit 120, a remote control device 130 to remotely control the indoor unit 110 or the outdoor unit 120, and an intermediate connection line 140 to electrically connect the indoor unit 110 to the outdoor unit 120.

According to an embodiment, the indoor unit 110 may include a discharger 200 (see FIG. 2A) to discharge air introduced from outside and heat-exchanged and a blower 210 (see FIG. 2B) to suction and blow air. A case 113 of the indoor unit 110 may include a sensor portion 114 including at least one sensor to obtain indoor environmental data.

According to an embodiment, the discharger 200 and the blower 210 may each be disposed in the case 113 to define appearance of the indoor unit 110, the discharger 200 may be disposed at an upper portion thereof and the blower 210 may be disposed at a lower portion thereof. For air circulation, the case 130 may also provide a suction inlet at a rear surface of the case 130 to provide air supplied from outside to the blower 210. The discharger 200 may include a first discharger 110 and a second discharger 112 to discharge air introduced from the blower 210. The first discharger 111 and the second discharger 112 may each have a cylindrical shape and may each rotate about central axes parallel to each other.

According to an embodiment, the first discharger 111 and the second discharger 112 may rotate independently of each other to adjust a discharge direction of air. For example, the first discharger 111 and the second discharger 112 may discharge the air in the same direction and may discharge the air in different directions. The first discharger 111 and the second discharger 112 may each define a closed portion at an upper portion thereof and an opening at a lower portion thereof. In this example, the air blown from the blower 210 may be introduced through a lower portion of each of the first discharger 111 and the second discharger 112. According to an embodiment, the first discharger 111 and the second discharger 112 may each provide discharge outlets to discharge air into an indoor space. In some examples, the first discharger 111 may define a first discharge outlet 211 and the second discharger 112 may define a second discharge outlet 212. In this example, air introduced from the blower 210 may be discharged into the indoor space through the discharge outlets.

The discharger 200 may further include a center body 213 between the first discharger 111 and the second discharger 112. The center body 213 may block a gap between the first discharger 111 and the second discharger 112 from outside. In this case, the center body 213 may include a display indicating an operation state of the indoor unit 110.

Referring back to FIGS. 2A and 2B, the blower 210 may include at least one blowing fan to forcibly convect air. For example, the blower may include a first blowing fan 216 and a second blowing fan 217 operated independently of each other. The first blowing fan 216 and the second blowing fan 217 may be operated together as necessary or at least one of the first blowing fan 216 or the second blowing fan 217 may be operated.

The first blowing fan 216 may be communicated with the first discharger 111 by a first duct 214 and the second blowing fan 217 may be communicated with the second discharger 112 by a second duct 215. In this example, the air blown by the first blowing fan 216 may move to the first discharger 111 through the first duct 214 to be discharged to the indoor space through the first discharge outlet 211. Similarly, the air blown by the second blowing fan 217 may be moved to the second discharger 112 through the second duct 215 to be discharged to the inner space through the second discharge outlet 212.

In some examples, a heat exchanger may be disposed between the blowing fan 210 and the suction inlet disposed at the rear surface of the case 130 to exchange air with refrigerant.

In some cases where the air conditioner 100 operates in a cooling mode, the air introduced from the outlet unit 120 through the suction inlet is cooled by a heat exchanger during the operation of the air blower 210 and the cooled air may be discharged to the inner space through the discharger 200. In some cases where the air conditioner 100 is operated in a heating mode, the air introduced from the outside through the suction inlet is heated by the heat exchanger during the operation of the blower 210 and the heated air may be discharged to the inner space through the discharger 200.

According to an embodiment, the outdoor unit 120 may include a compressor to receive and compress refrigerant and an outdoor heat exchanger to exchange refrigerant with outdoor air. In addition, the outdoor unit 120 may include an accumulator to extract gas refrigerant from the supplied refrigerant and supply the extracted gas refrigerant to the compressor and a four-way valve to select a flow path of the refrigerant according to heating operation. In addition, the outdoor unit 120 may further include a plurality of sensors, valves and an oil recovery portion.

The outdoor unit 120 may operate the compressor and an outdoor heat exchanger and compress and heat exchanges the refrigerant according to the setting to provide the indoor unit 110 with the refrigerant. The outdoor unit 120 is driven under the control of the indoor unit 110, and as cooling or heating capacity varies, a number of operations of the compressors of the outdoor unit 120 may vary. The outdoor unit 120 may include a sensor portion 121 including at least one sensor to measure or sense environmental data. The sensor portion 121 may include a temperature measurement sensor, a humidity measurement sensor, and an airflow measurement sensor. In addition, the sensor portion 121 may include various types of sensors to obtain external environmental data (e.g., a radiation temperature, air pressure, and the like) and information of air conditioner 100 (e.g., condensing pressure, evaporating pressure, a number of rotations of the compressor, and the like) in addition to the temperature measurement sensor, the humidity measurement sensor, and the airflow measurement sensor. The sensor portion 121 may transmit a signal including measured or obtained information to the indoor unit 110.

The intermediate connection line 140 may electrically connect the outdoor unit 120 to the indoor unit 110. The intermediate connection line 140 may provide power received from a first one of the outdoor unit 120 and the indoor unit 110 to a second one of the outdoor unit 120 and the indoor unit 110. For example, when the indoor unit 110 is connected to an alternating current (AC) power and directly receives the power, the indoor unit 110 may provide the power to the outdoor unit 120 through the intermediate connection line 140. For example, when the outdoor unit 120 is connected to the AC power and directly receives the power, the outdoor unit 120 may provide the power to the indoor unit 110 through the intermediate connection line 140. When the power is supplied to either the outdoor unit 120 or the indoor unit 110, the power may be supplied to both the outdoor unit 120 and the indoor unit 110 and the intermediate connection line 10 may function to supply the power.

According to one embodiment, the remote control device 130 may remotely control the indoor unit 110 or the outdoor unit 120 and may transmit, to the indoor unit 110, instructions (or signals) to perform temperature setting and control by the indoor unit 110, controlling of a blowing direction by the indoor unit 110, and time setting. The remote control device 130 may be wirelessly connected to the indoor unit 110, may transmit a user's control instruction to the indoor unit 110, and may receive and display state information of the indoor unit 110. Alternatively, the remote control device 130 may perform wired or wireless communication depending on connection with the indoor unit 110 and may include a communicator to transmit or receive a signal including the user's control instruction.

The structure of the air conditioner 100 described above with reference to FIGS. 1, 2A, and 2B is merely an example structure to perform an operation described below and the air conditioner 100 of the present disclosure may have various shapes in addition to the structure shown in the drawings.

Figure 3:
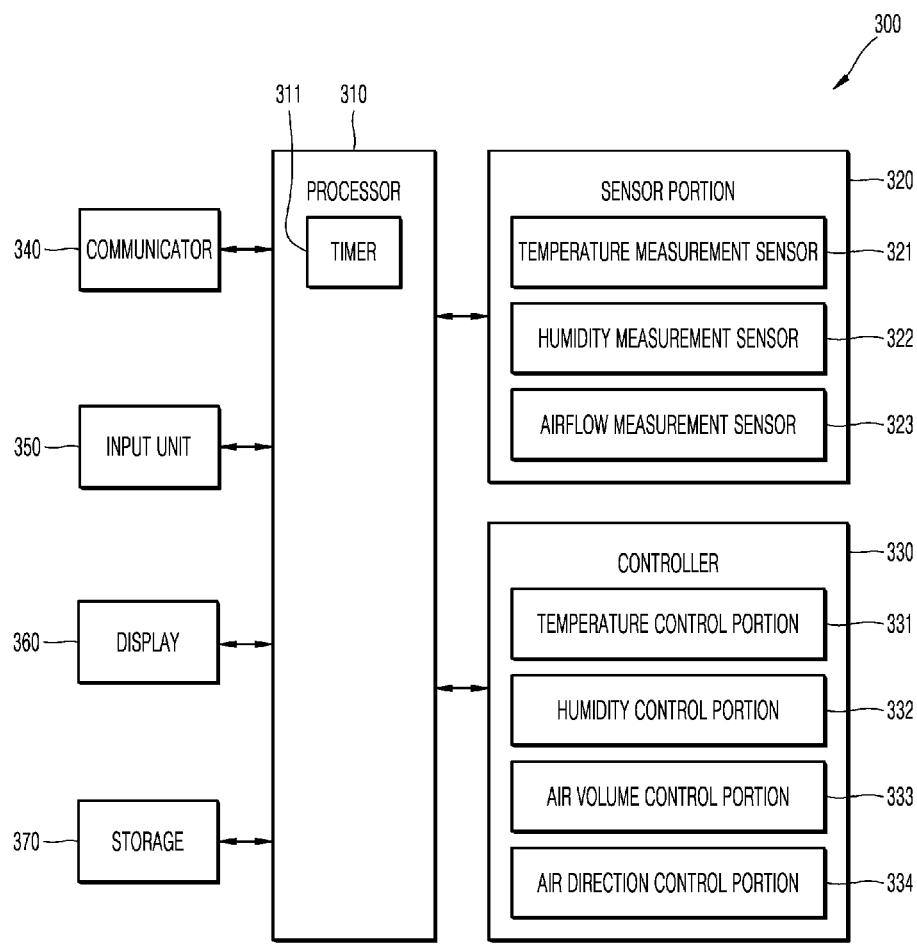
FIG. 3 is a block diagram showing an example control apparatus of an air conditioner 100.

FIG. 3 is a block diagram showing an example control device of an air conditioner 100.

Referring to FIG. 3, according to an embodiment of the present disclosure, a control device 300 of the air conditioner 100 may include a sensor portion 320 including at least one sensor, a controller 330 including at least one control portion to control various functions of the air conditioner 100, and a communicator 340 to transmit and receive a signal based on wired and wireless communication with the indoor unit 120 and the remote control device 130. The control device 300 may include an input unit 350 to receive an instruction from a user, a display 360 to display operation state information on an operation state of the air conditioner 100, a storage 370, and a processor 310 including a timer 311.

The configuration of the control device 300 shown in FIG. 3 is according to an embodiment, the components are not limited to the embodiment shown in FIG. 3, and some components may be added, changed, or omitted as necessary. Further, the indoor unit 110 of the air conditioner 100 or the outdoor unit 120 of the air conditioner 100 may include the control device 300 to be operated. Alternatively, the control device 300 of the air conditioner 100 may be configured as a separate device.

According to an embodiment, the sensor portion 320 may include a temperature measurement sensor 321 to measure a temperature, a humidity measurement sensor 322 to measure humidity, and an airflow measurement sensor 323 to measure airflow. The sensor portion 320 may further include at least one sensor to obtain various pieces of information on an environment of a space where the indoor unit 110 is disposed in addition to the temperature measurement sensor 321, the humidity measurement sensor 322, and the airflow measurement sensor 323. The sensor portion 320 may be included in the indoor unit 110 or in the outdoor unit 120. Alternatively, the sensor portion 320 may be included in the indoor unit 110 and the outdoor unit 120.

According to an embodiment, the temperature measurement sensor 321 may measure various temperatures in an indoor space, such as an indoor temperature, a radiation temperature, an airflow discharge temperature, an airflow suction temperature, and a floor temperature of the space where the indoor unit 110 is disposed. The temperature measurement sensor 321 may include a plurality of temperature sensors. The temperature measurement sensor 321 may detect a temperature of air discharged by the air conditioner 100, a temperature of air suctioned to the air conditioner 100, a temperature of an indoor space, a temperature of a pipe to suction refrigerant, and a temperature of the pipe to discharge the refrigerant using each temperature sensor among the plurality of temperature sensors and may provide a processor 310 with the detected temperature information.

According to one embodiment, the humidity measurement sensor 322 may measure the humidity of the space where the indoor unit 110 is disposed. The humidity measurement sensor 322 may measure humidity based on a content of water vapor contained in the indoor atmosphere. The humidity measurement sensor 322 may measure indoor relative humidity.

According to an embodiment, the airflow measurement sensor 323 may measure indoor airflow while the air conditioner 100 is operating. The airflow measurement sensor 323 may measure the airflow about where the wind is blowing and where the wind is heading in the indoor space. The airflow measurement sensor 323 may measure an indoor airflow speed. The airflow measurement sensor 323 may measure the indoor air velocity based on the operation of the air conditioner 100.

The algorithm for measuring the temperature, the air volume, or the air direction by at least one sensor of the sensor portion 320 may be included in the sensor portion 320. Alternatively, the algorithm may be measured by the operation of the processor 310. Further, the control device 121 of the outdoor unit 120 or the indoor unit 110 may include at least one sensor of the sensor portion 320.

According to an embodiment, the controller 330 may include various control portions to control operation of at least one of the indoor unit 110 or the outdoor unit 120. For example, the controller 330 may include a temperature control portion 331 to control temperature measurement, a humidity control portion 332 to control humidity measurement, an air volume controller 333 to control an amount of air discharged by the indoor unit 110, and a wind direction control portion 334 to control a direction of air discharged by the indoor unit 110. The controller 330 may further include at least one control portion to control various operations of the indoor unit 110 or the outdoor unit 120 in addition to the temperature control portion 331, the humidity control portion 332, the air volume control portion 333, and the wind direction control portion 334.

According to one embodiment, the air volume control portion 333 may control the amount of air discharged through the discharger 200. In some examples, the air volume control portion 333 may adjust a number of rotations of each of the first blowing fan 216 and the second blowing fan 217 based on the control signal provided by the processor 310 to control an amount of air discharged through the discharger 200.

According to an embodiment, the wind direction controller 334 may adjust an angle of at least one of the first discharger 111 or the second discharger 112 to control a direction of air discharged through the first discharger 111 and the second discharger 112. For example, the wind direction controller 340 may adjust a rotation angle of the first discharger 111 and the second discharger 112 or the angle of the first discharge outlet 211 and the second discharge outlet 212 based on the control signal provided by the processor 310 to control the direction of the air discharged through the first discharger 111 and the second discharger 112.

According to an embodiment, the communicator 340 may perform a wired or wireless data communication function. For example, the communicator 340 may perform data communication with an outdoor unit 120 and a remote control device 130 or data communication with another air conditioner (e.g., an indoor unit). In addition, the communicator 340 may communicate with various types of data communication apparatuses (e.g., TVs, ventilation systems, fans, refrigerators, and the like). The communicator 340 may receive a signal including various pieces of information obtained or measured by the outdoor unit 120. The communicator 340 may receive data on the surrounding environment obtained or measured by the outdoor unit 120 (e.g., an indoor temperature, an outdoor temperature, indoor humidity, outdoor humidity, outdoor airflow, indoor airflow, a radiation temperature, air pressure, and the like).

According to an embodiment, the input unit 350 receives, from users, data related to the operation of the air conditioner 100, for example, data related to operation setting, an operation mode, a temperature, air volume, a wind direction, and the like, and provides the processor 310 with the data. In this example, the input unit 350 may include a physical manipulation member such as a switch and a button or an electrical manipulation member such as a touch key, a touch pad, and a touch screen.

For example, the input unit 350 may receive data related to an operation mode (e.g., a rapid mode, a comfortable mode, a human body adaptation mode, and the like, described below) from a user and may provide the processor 310 with the data related to the operation mode. Further, the processor 310 may drive the air conditioner 100 in an operation mode corresponding to the data input from the user.

According to an embodiment, the display 360 may display various pieces of operation state information regarding the operation state of the air conditioner 100 and may be provided on an outer surface of the indoor unit 110 (e.g., the center body 213 of FIG. 2A).

According to an embodiment, the storage 370 may store information, data, and programs used to operate the air conditioner 100. In some examples, the storage 370 may store indoor environmental data such as an indoor temperature, indoor humidity, an indoor airflow speed, and an indoor radiation temperature and outdoor environmental data such as an outdoor temperature, outdoor humidity, an outdoor airflow speed, and an outdoor radiation temperature described below in a predetermined area (e.g. the memory). In addition, various instructions operated by the processor 310 may be stored in a predetermined area (e.g., the memory) of the storage 370. In addition, the storage 370 may store reference data information on reference data indicating a query result to a plurality of users in advance. The storage 370 may store, in a predetermined area (e.g., memory), an algorithm (e.g., customer comfort equation, CCE) newly generated based on the indoor environmental data, the outdoor environmental data, and the reference data. The CCE is an algorithm that may be applied to an air conditioner to provide a comfortable environment to a user. In addition, the air conditioner is operated by applying the CCE to provide an optimal comfort to the user.

In addition, the reference data is query result data for a plurality of users. The query may include various queries for determining a user sensation level in response to the surrounding environment by attaching sensors to body portions of the user, among the plurality of users, in the enclosed environment to detect a skin temperature. For example, the query is used to determine a warmth level, a comfort level, an airflow level, a room temperature level, and a dryness level at each of the body portions of the user among the plurality of users and may have different weights depending on the levels. The reference data is obtained by averaging sensation degrees felt by the plurality of users.

According to an embodiment, the processor 310 may perform a control operation described below with reference to the information stored in the storage 370. The storage 370 may store a program for signal processing and controlling in the processor 310 and may store a signal-processed image, audio, or data signal. The storage 370 may store various platforms. The storage 370 may include, for example, at least one of a flash memory type memory medium, a hard disk type memory medium, a multimedia card micro type memory medium, or a card type memory (e.g., secure digital (SD) or eXtreme Digital (XD) memory, and the like), random-access memory (RAM), or read-only memory (ROM) (e.g., electrically erasable and programmable read only memory (EEPROM)).

For example, the processor 310 may detect the indoor environment and the outdoor environment according to a method described below and may drive the air conditioner 100 according to the result. In addition, the processor 310 may include at least one processor to drive the air conditioner 100.

According to one embodiment, the at least one processor 310 may obtain various data on airflow speed and indoor environment by using at least one sensor of the sensor portion 320 while the air conditioner 100 is operating and may apply the obtained airflow speed, various data on the indoor environment, and reference data to the first algorithm. The first algorithm may include a predicted mean vote (PMV). The PMV index is used to evaluate thermal environment based on thermal equilibrium between the ambient environment and the human body and may be obtained using various parameters for forming a human warmth sensation, such as metabolism, thermal resistance by clothing, a radiation temperature, an airflow rate, and relative humidity.

The reference data may include an average value of each of the indoor temperatures and the indoor humidity in a closed space where the air conditioner is not operated, skin temperatures for each user among the plurality of users in the closed space, and values of user subjective properties corresponding to user subjective information on ambient environment.

According to an embodiment, the at least one processor 310 applies a value of at least one of the obtained airflow speed, the indoor environmental data, or the reference data to the first algorithm using at least one model to generate a second algorithm. The indoor environmental data may include indoor temperature information, indoor humidity information, and radiation temperature information generated while the air conditioner 100 is operating. In addition, the model may include at least one of an artificial neural network (ANN), XGBoost, or random forest. The at least one processor 310 may store the generated second algorithm in the storage 370.

According to one embodiment, the at least one processor 310 may obtain, through the communicator 340, outdoor environmental data obtained or measured by the outdoor unit 120 (e.g., an indoor temperature, an outdoor temperature, indoor humidity, outdoor humidity, outdoor airflow, indoor airflow, a radiation temperature, air pressure, and the like). Also, the at least one processor 310 may obtain information (e.g., condensing pressure, evaporation pressure, a number of rotations of the compressor, and the like) of the air conditioner 100 through the communicator 340. The indoor environmental data obtained by the at least one processor 310 may include the indoor temperature information on the indoor space where the indoor unit 110 is located, the indoor humidity information, and the radiation temperature information. The at least one processor 310 may also obtain various environmental data from the outdoor unit 120.

According to an embodiment, the at least one processor 310 may obtain environmental data including indoor environmental data of an indoor space where the air conditioner 100 is located and outdoor environmental data of an outdoor space where the air conditioner is not located and may compare a value of at least one first parameter of the obtained environmental data with a value of at least one second parameter of the second algorithm. The at least one processor 310 may compare at least one parameter (e.g., a temperature, humidity, an airflow speed, and the like) included in environmental data obtained from the outdoor unit 120 with at least one parameter of the second algorithm (e.g., the temperature, the humidity, the airflow speed, and the like).

According to an embodiment, the at least one processor 310 may compare at least one parameter (e.g., temperature, humidity, airflow speed, and the like) included in the environmental data obtained by the outdoor unit 120 with at least one parameter (e.g., temperature, humidity, airflow speed, and the like) of the second algorithm and may generate a control signal capable of controlling the indoor temperature and the indoor humidity by the air conditioner 100. Alternatively, the at least one processor 310 may generate a control signal capable of controlling an amount of air discharged by the air conditioner 100. According to an embodiment, the at least one processor 310 may control the operation of the air conditioner 100 based on the control signal.

According to an embodiment, the at least one processor 310 obtains three parameters to correspond the value of the at least one first parameter to the value of the at least one second parameter and may generate a heat transfer coefficient based on the obtained three parameters and the obtained airflow speed. The heat transfer coefficient is used to represent an influence of the airflow speed used for the first algorithm. The three parameters reflect airflow information in the first algorithm and influence on the airflow. The at least one processor 310 may adjust the values of the three parameters and may minimize a difference between the first parameter value and the second parameter value.

According to one embodiment, the at least one processor 310 may generate the control signal based on the generated heat transfer coefficient and may adjust at least one of the temperature, the humidity, and the air volume based on the generated control signal.

According to an embodiment, the at least one processor 310 may obtain the three parameters for minimizing the difference between the first parameter value and the second parameter value through <Equation 1> below.

$$MD(a, b, c) = \left\{ \frac{\left[\sum_{j \in T} \sum_{i \in E_k} [s_i(t_j) - PMV_A(\Delta t_j)]^2\right]}{|T|} \middle| a, b, c \right\} \quad \text{[Equation 1]}$$

In <Equation 1>, Si represents reference data results, |T| represents a number of elements in the set T, Ek represents a set of customers participating in the survey under condition k, PMVA(Δtj) represents an average value in a first algorithm under condition of (tj−1, tj). In addition, tj represents a time jth when customers participated the survey, and (a, b, c) represents parameters reflecting airflow information in the first algorithm.

According to an embodiment, the at least one processor 310 may obtain the heat transfer coefficient by substituting a, b, and c obtained through <Equation 1> to <Equation 2> below.

$$H_c = a + bV^c \quad \text{[Equation 2]}$$

In <Equation 2>, V represents an airflow speed, and a, b, and c may have constant values. The at least one processor 310 obtains a heat transfer coefficient through <Equation 1> and <Equation 2> and reflects the obtained heat transfer coefficient in the second algorithm to improve user comfort. The at least one processor 310 generates a control signal capable of controlling at least one of the temperature, the humidity, or the air volume, by the air conditioner 100, based on the obtained heat transfer coefficient and may control at least one of the temperature, the humidity, or the air volume, by the air conditioner 100, based on the generate control signal.

Figure 4:
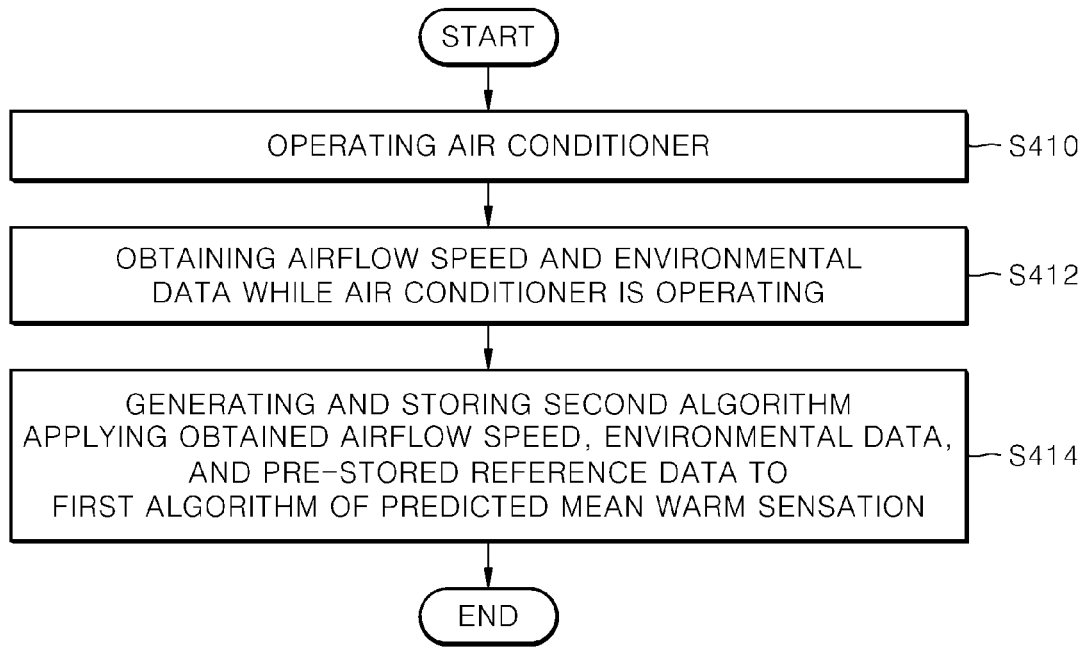
FIG. 4 is a flowchart showing an example operation of an air conditioner.

FIG. 4 is a flowchart showing example operation of an air conditioner.

Hereinafter, the operation of the air conditioner 100 according to an embodiment of the present disclosure is described in detail with reference to FIG. 4.

According to one embodiment, at least one processor 310 may operate the air conditioner (S410). The at least one processor 310 may operate the air conditioner based on at least one instruction received from a remote control device 270 or at least one instruction input at an input unit 350.

According to an embodiment, the at least one processor 310 may obtain an airflow speed and indoor environmental data while the air conditioner is operating (S412). The at least one processor 310 may obtain indoor environmental data on an indoor space where the indoor unit 110 is located by using at least one sensor of the sensor portion 320. In addition, the at least one processor 310 may obtain environmental data including outdoor environmental data on the outdoor space where the outdoor unit is not located by using the sensor portion 121. The at least one processor 310 may compare a value of at least one first parameter (e.g., the indoor temperature, the outdoor temperature, the indoor humidity, the outdoor humidity, the outdoor airflow, the indoor airflow, the radiation temperature, the air pressure, and the like) of the obtained environmental data with the value of the at least one second parameter of the second algorithm (e.g., an indoor temperature, an outdoor temperature, indoor humidity, outdoor humidity, outdoor airflow, indoor airflow, a radiation temperature, air pressure, and the like).

According to one embodiment, the at least one processor 310 generates a second algorithm applying the obtained airflow speed, indoor environmental data, and pre-stored reference data to a first algorithm of predicted mean warm sensation and may store the generated second algorithm in a storage 370 (S414). The at least one processor 310 may obtain a heat transfer coefficient to minimize a difference between the value of the at least one first parameter and the value of the at least one second parameter. The at least one processor 310 may obtain the heat transfer coefficient through <Equation 1> and <Equation 2> and may reflect the obtained heat transfer coefficient to a second algorithm to improve user comfort. The at least one processor 310 may generate a control signal capable of controlling at least one of the temperature, the humidity, or the air volume, by the air conditioner 100, based on the obtained heat transfer coefficient. The at least one processor 310 may control at least one of the temperature, the humidity, or the air volume, by the air conditioner 100, based on the generated control signal.

Figure 5:
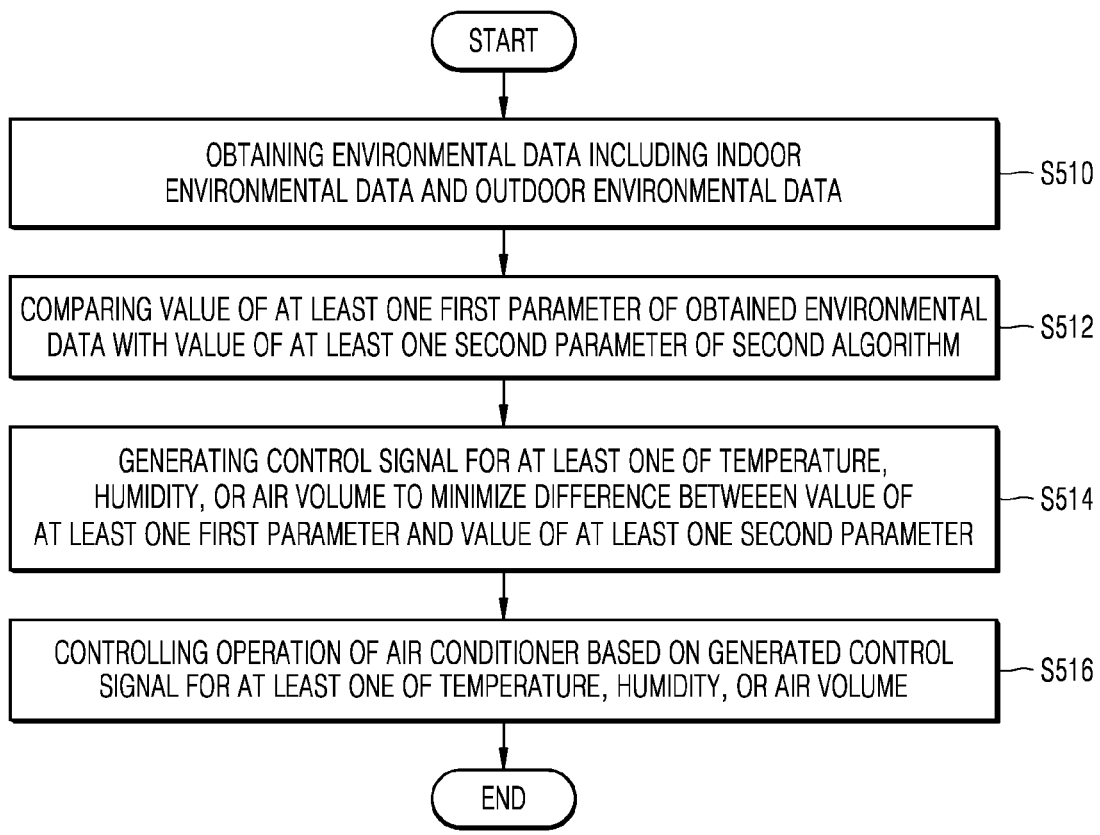
FIG. 5 is a flowchart showing an example operation of an air conditioner.

FIG. 5 is a flowchart showing an example operation of an air conditioner.

Hereinafter, the operation of an air conditioner 100 according to another embodiment of the present disclosure is described in detail with reference to FIG. 5 as follows.

According to an embodiment, at least one processor 310 may obtain environmental data including indoor environmental data and outdoor environmental data (S510). The indoor environmental data may include indoor temperature information of an indoor space where an indoor unit 110 is located, indoor humidity information, and radiation temperature information. The outdoor environmental data may include outdoor temperature information, outdoor humidity information, outdoor airflow speed information, outdoor radiation temperature information, and the like of a space where the outdoor unit 120 is placed. A sensor 121 of an outdoor unit 120 may obtain indoor environmental data.

According to an embodiment, the at least one processor 310 may compare a value of at least one first parameter of the obtained environmental data with a value of at least one second parameter of a pre-stored second algorithm (S512). The first parameter or the second parameter may include various parameters of the environmental data such as the indoor temperature, the outdoor temperature, the indoor humidity, the outdoor humidity, the outdoor airflow, the indoor airflow, the radiation temperature, and the air pressure. The second algorithm may be generated by applying indoor airflow speed, indoor environmental data, and reference data to the first algorithm. The second algorithm may be an algorithm for variably adjusting a value of the at least one parameter in the first algorithm.

The first algorithm may be a predicted mean value (PMV). In addition, the at least one processor 310 applies a value of the at least one of the obtained airflow speed, the indoor environmental data, and the reference data to the first algorithm using at least one model to generate the second algorithm. The model may include at least one of an artificial neural network (ANN), XGboost, or random forest.

According to an embodiment, the at least one processor 310 may generate a control value of at least one of a temperature, humidity, or air volume to minimize a difference between the value of the at least one first parameter and the value of the at least one second parameter (S514). According to an embodiment, the at least one processor 310 may obtain three parameters to correspond the value of the first parameter of the environmental data to the value of the second parameter of the second algorithm. In addition, the at least one processor 310 may generate a heat transfer coefficient based on the obtained three parameters and the obtained airflow speed. The heat transfer coefficient is a coefficient that best represents an influence of the airflow speed used for the first algorithm. The three parameters are parameters reflecting airflow information in the first algorithm and influence on the airflow. The at least one processor 310 may adjust the values of the three parameters to minimize the difference between the first parameter value and the second parameter value.

According to an embodiment, the at least one processor 310 may control the operation of the air conditioner based on the generated at least one control signal (S516). The at least one processor 310 may generate the control signal based on the heat transfer coefficient and may control the indoor temperature and the indoor humidity, by the air conditioner 100, based on the generated control signal. In addition, the at least one processor 310 may adjust an amount of air discharged by the air volume control portion 333.

Figure 6A:
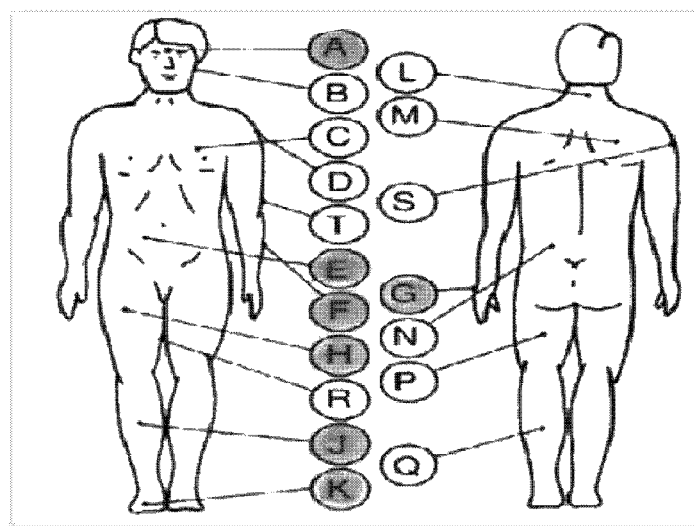
FIG. 6A is an exemplary diagram showing at least one position of a user's body to attach at least one sensor.
Figure 6B:
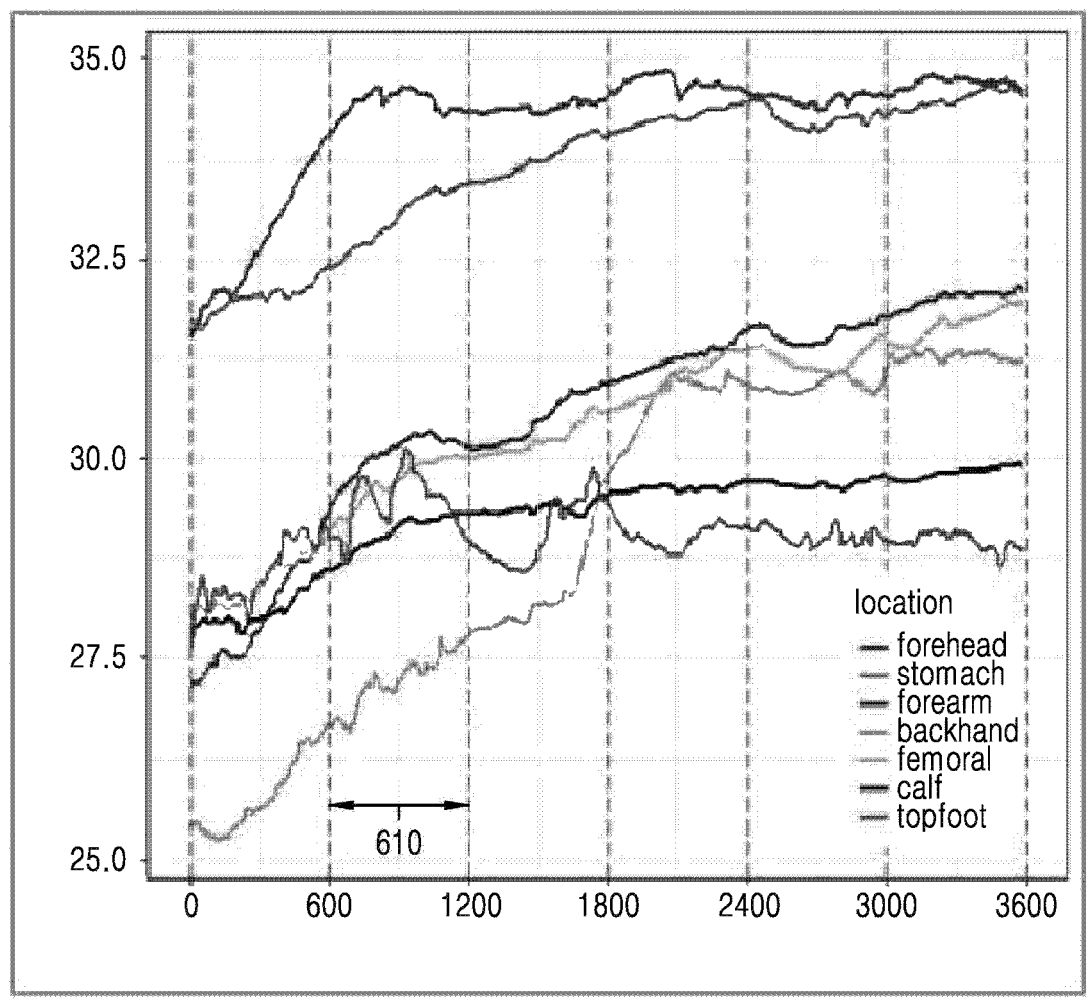
FIG. 6B is an exemplary diagram showing at least one skin temperature obtained by at least one sensor attached to at least one portion of user's body.

FIG. 6A is an exemplary diagram showing example positions of user's body to attach at least one sensor. FIG. 6B is an exemplary diagram showing an example skin temperature obtained by at least one sensor attached to at least one user's body portion.

Referring to FIGS. 6A and 6B, the sensor may be attached to various positions such as a user's forehead, chest, stomach, femoral, and calf. In addition, after the sensor is attached to the user's body portion, the skin temperature measured for a certain time period 610 may be used to generate reference data.

Figure 7:
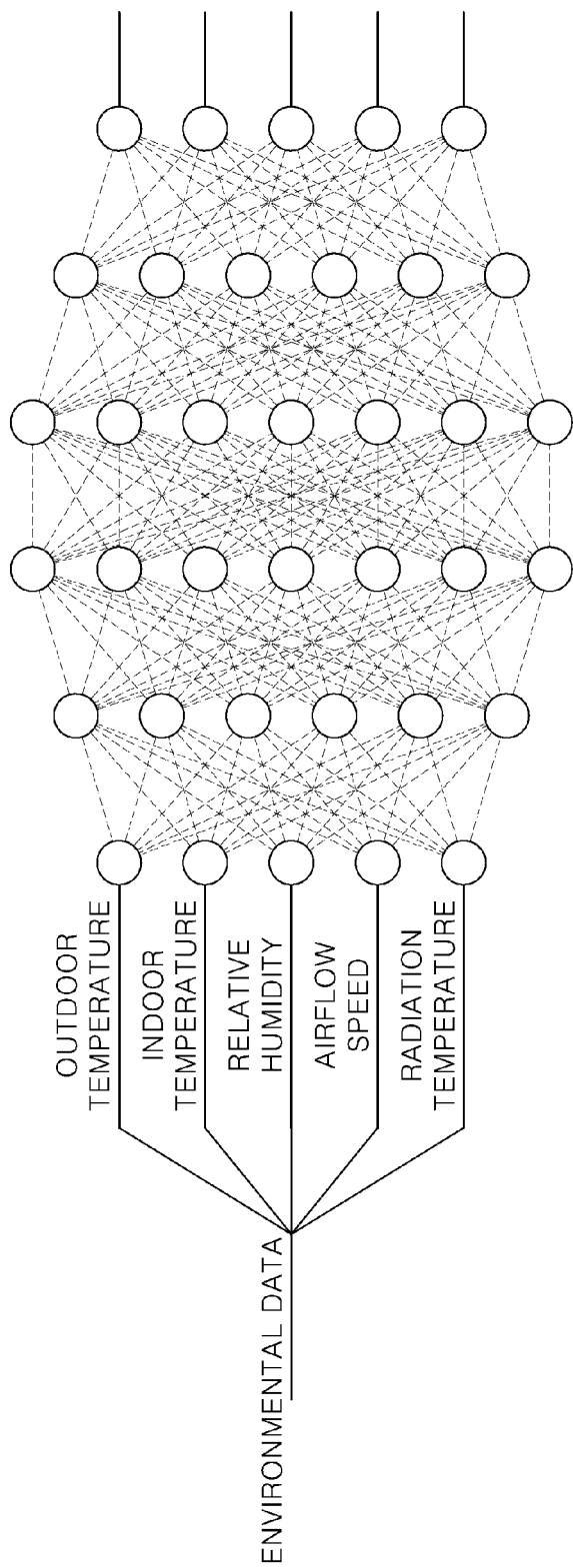
FIG. 7 is an exemplary diagram showing an example model.

FIG. 7 is an exemplary diagram showing an example model.

Referring to FIG. 7, according to an embodiment, at least one processor 310 of an air conditioner 110 may apply a value of at least one of an obtained airflow speed, indoor environment data, and pre-stored reference data to a PMV to generate a new algorithm. The airflow speed, the indoor environment data, and the reference data are measured or obtained in a closed space where the air conditioner 110 is not operated. The at least one processor 310 may apply the airflow speed, the indoor environment data, and the reference data to the PMV using at least one model to generate new algorithm. For example, the at least one processor 310 may generate the second algorithm based on environmental data (e.g., an outdoor temperature, an indoor temperature, relative humidity, an airflow speed, a radiation temperature, metabolism, an amount of clothing, a set temperature, an airflow discharge temperature, an airflow suction temperature, a wind volume, a wind direction, an angle of a vane, a frequency of a compressor, an outdoor unit factor, and the like). When the above model is applied using the environmental data as input parameters, data on the average indoor temperature, a speed at which the average temperature is reached, an arrival time, a vertical temperature difference, a temperature distribution rate, a floor temperature distribution rate, comfort, warmth sensation, average skin temperature prediction, and power consumption prediction may be obtained.

The model may include at least one of an artificial neural network (ANN), XGBoost, or random forest. The ANN is a statistical learning algorithm inspired by biological neural networks in machine learning and cognitive science. The ANN is a program in which artificial neurons forming a network through synaptic connection change a binding strength of synapses through learning to solve problems. In addition, XGBoost is a program that implements a tree method using a second gradient boosting (Newton boosting) technique. The random forest is a program that creates a decision tree by randomly extracting data from given data and collects results of each model to form a final prediction model. The random forest uses an ensemble running method to prevent overfitting with less accuracy when data other than training data is input. Although the present disclosure has been described as using the ANN, but this is only an example, and it is obvious to those skilled in the art that various models may be applied.

Figure 8:
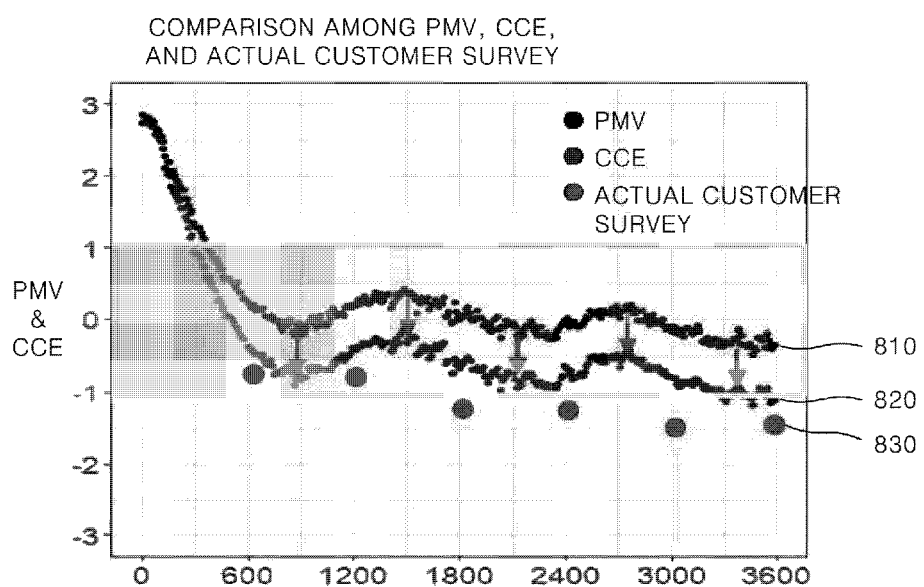
FIG. 8 is an exemplary diagram showing example comparison among a first algorithm, a second algorithm, and user's survey results.

FIG. 8 is an exemplary diagram showing example comparison among a first algorithm, a second algorithm, and a user's survey results.

Referring to FIG. 8, an X-axis represents a time and an Y-axis represents a comfort index. For example, when the person currently feels very hot, the comfort index is 3 or more, and when the person feels very cold, the comfort index is −3 or less. When the comfort index is between −1 and +1, the person may feel comfortable. According to an embodiment of the present disclosure, a second algorithm 820 is closer to an actual comfort degree of a user 830 than a first algorithm 810 (e.g., the PMV).

A user comfort degree is obtained during operation of the air conditioner 100 for a time period (e.g., 1 hour). When the comfort index is between −1 and +1, the person may feel comfortable. When the comfort index is greater than 1, the air conditioner 100 lowers the set temperature of the air conditioner or controls an air volume controller 333 to adjust air volume to strong wind, to lower the comfort index to be less than 1. Alternatively, when the comfort index is less than −1, the air conditioner 100 may increase the set temperature of the air conditioner or may control an air volume controller 333 to operate the air conditioner with less wind, to increase the comfort index to be greater than −1. In addition, the operation of the second algorithm may be stopped based on the comfort index being maintained between −1 and +1 for a predetermined time period (e.g., 20 minutes).

Referring to FIG. 8, the experiment using the PMV in the related art and new algorithm (e.g., CCE) showed that the experiment using the new algorithm of the present disclosure well matches with actual user survey than the experiment using the PMV in the related art. For example, 34% of deviation is reduced in cooling and 13% of deviation is reduced in heating when using the new algorithm of the present disclosure compared using to the PVM in related art, thereby providing better comfort to the user.

Figure 9A:
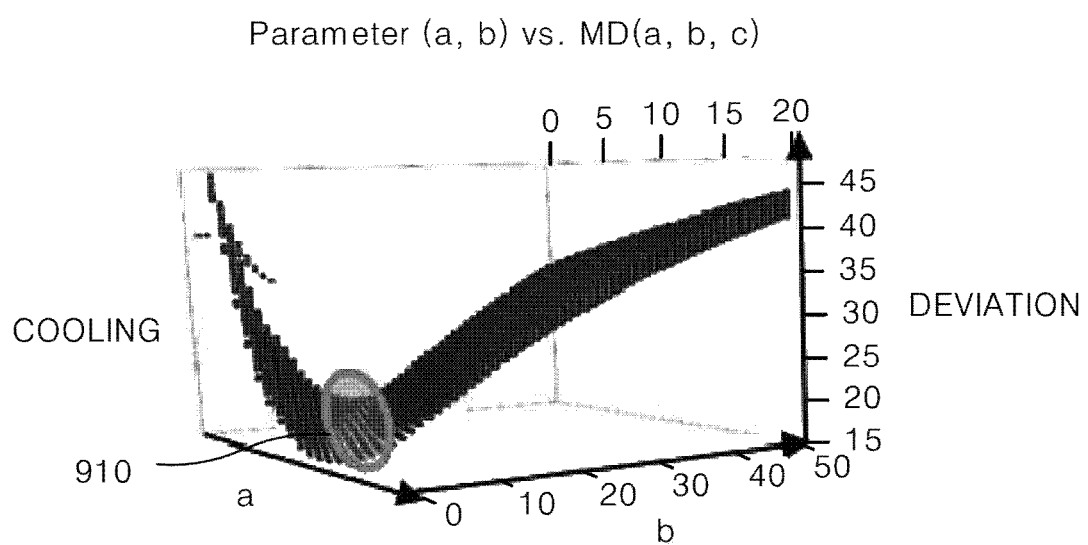
FIG. 9A is an exemplary diagram showing an example area corresponding to a value of a first parameter and a value of a second parameter to improve comfort in cooling when a value of a third parameter is fixed among three parameters reflecting airflow information.
Figure 9B:
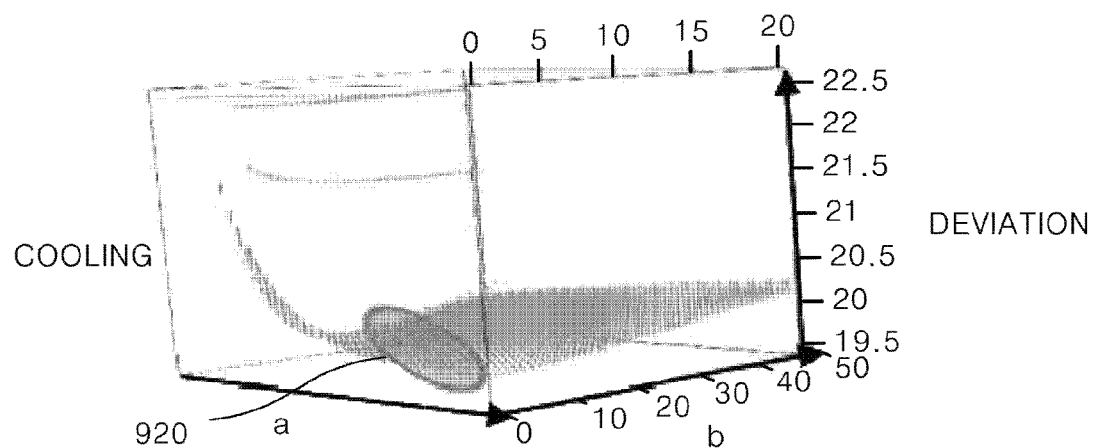
FIG. 9B is an exemplary diagram showing an example area corresponding to a value of a first parameter and a value of a second parameter to improve comfort in heating when a value of a third parameter is fixed among three parameters reflecting airflow information.

FIG. 9A is an exemplary diagram showing an example area corresponding to a value of a first parameter and a value of a second parameter to improve comfort in cooling when a value of a third parameter is fixed among three parameters reflecting airflow information. FIG. 9B is an exemplary diagram showing an example area corresponding to a value of a first parameter and a value of a second parameter to improve comfort in heating when a value of a third parameter is fixed among three parameters reflecting airflow information.

The three parameters (a, b, c) are parameters to reflect airflow information to a first algorithm and influence on airflow. The at least one processor 310 may adjust the values of the three parameters to minimize a difference between the first parameter value and the second parameter value. Referring to FIG. 9A, when a value of a third parameter (c) is fixed, a first parameter (a) has a value of about 10, and a second parameter (b) has a value of about 0 to improve comfort in cooling, a first area 910 is an area where a difference between the first parameter value and the second parameter value is minimized. The at least one processor 310 may obtain heat transfer coefficient by substituting values of the three parameters to <Equation 2>. Referring to FIG. 9B, when the value of the third parameter (c) is fixed, a first parameter (a) has a value of about 10, and the second parameter (b) has a value of about 10 to feel comfortable in heating, a second area 920 is an area where a difference between the first parameter value and the second parameter value is minimized.

Figure 10A:
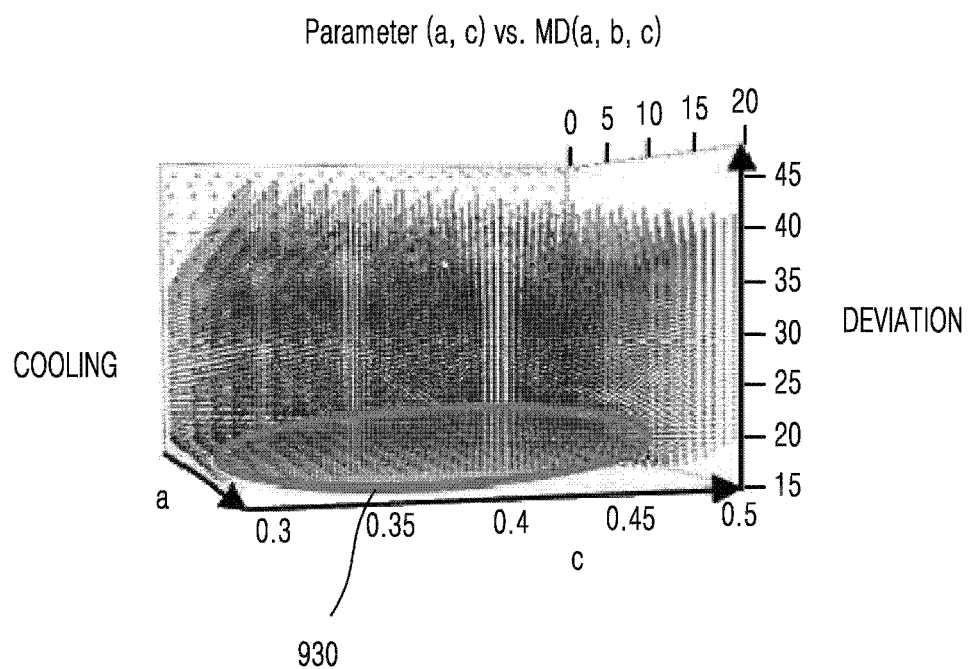
FIG. 10A is an exemplary diagram showing an example area corresponding to a value of a first parameter and a value of a third parameter to improve comfort in cooling when a value of a second parameter is fixed among three parameters reflecting airflow information.
Figure 10B:
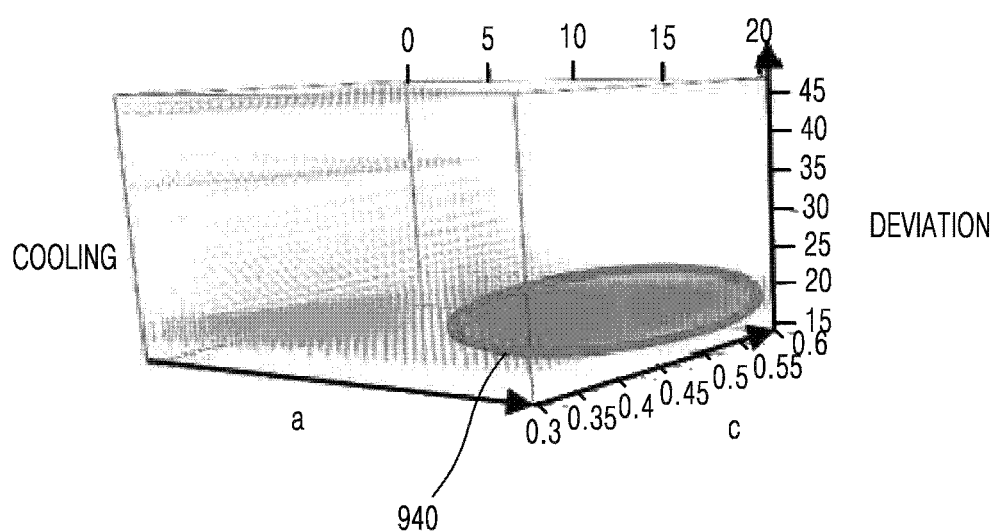
FIG. 10B is an exemplary diagram showing an example area corresponding to a value of a first parameter and a value of a third parameter to improve comfort in heating when a value of a second parameter is fixed among three parameters reflecting airflow information.

FIG. 10A is an exemplary diagram showing an example area corresponding to a value of a first parameter and a value of a third parameter to improve comfort in cooling when a value of a second parameter is fixed among three parameters reflecting airflow information. FIG. 10B is an exemplary diagram showing an example area corresponding to a value of a first parameter and a value of a third parameter to improve comfort in heating when a value of a second parameter is fixed among three parameters reflecting airflow information.

Referring to FIG. 10A, when a value of a second parameter (b) is fixed, the first parameter (a) has a value of about 5 to 10, and the third parameter (c) has a value of 0.3 to 0.45 to feel comfortable in cooling, a third area 930 is an area where a difference between the first parameter value and the second parameter value is minimized. Referring to FIG. 10B, when a value of the second parameter (b) is fixed, the first parameter (a) has a value of about 10 to 20, and the third parameter (c) has a value of about 0.32 to 0.5 to feel comfortable in heating, a fourth area 940 is an area where a difference between the first parameter value and the second parameter value is minimized.

Figure 11A:
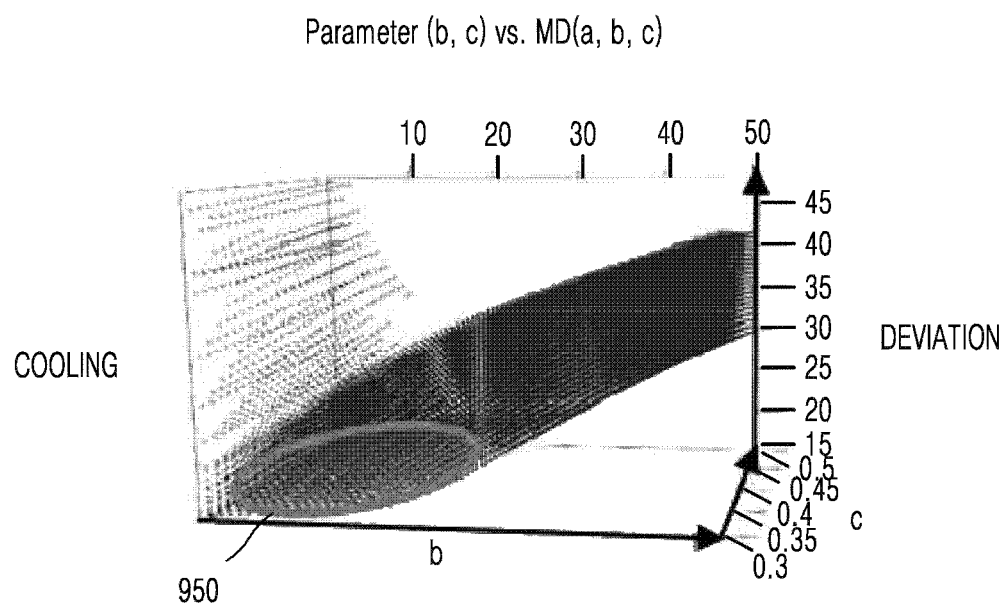
FIG. 11A is an exemplary diagram showing an example area corresponding to a value of a first parameter and a value of a third parameter to improve comfort in cooling when a value of the first parameter is fixed among three parameters reflecting airflow information.
Figure 11B:
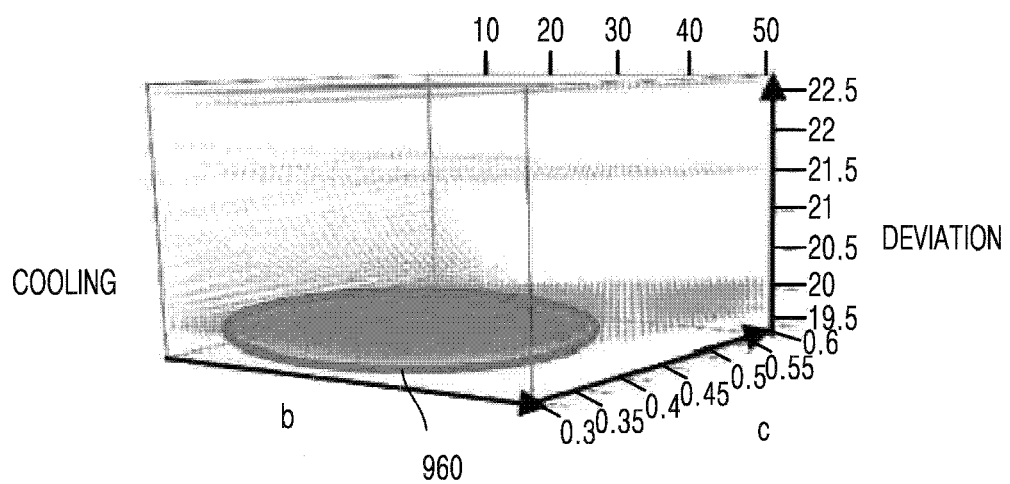
FIG. 11B is an exemplary diagram showing an example area corresponding to a value of a first parameter and a value of a third parameter to improve comfort in heating when a value of the first parameter is fixed among three parameters reflecting airflow information.

FIG. 11A is an exemplary diagram showing an example area corresponding to a value of a first parameter and a value of a third parameter to improve comfort in cooling when the value of the first parameter is fixed among three parameters reflecting airflow information. FIG. 11B an exemplary diagram showing an example area corresponding to a value of a first parameter and a value of a third parameter to improve comfort in heating when the value of the first parameter is fixed among three parameters reflecting airflow information.

Referring to FIG. 11A, when a value of a first parameter (a) is fixed, a second parameter (b) has a value of about 0.3 to 0.5, and a third parameter (c) has a value of about 29 to 42 to feel comfortable in cooling, a fifth area 950 is an area where a difference between the first parameter value and the second parameter value is minimized. Referring to FIG. 11B, when a value of a first parameter (a) is fixed, a second parameter (b) has a value of about 0 to 40 and a third parameter (c) has a value of about 0.35 to 0.55 to feel comfortable in heating, a sixth area 960 is an area where a difference between the first parameter value and the second parameter value is minimized. The values of the parameters in each of FIGS. 11A and 11B are only an example and the parameters may have various values to minimize the difference between the first parameter value and the second parameter value.

Steps in each of the flowcharts described above may be operated regardless of the shown sequence or may be performed simultaneously. Also, at least one component of the present disclosure and at least one operation performed by the at least one component may be implemented with hardware and/or software.

Although the present disclosure has been described as described above with reference to exemplary drawings, the present disclosure is not limited to the embodiments and drawings disclosed herein, and various modifications can be made by those skilled in the art within the scope of the technical idea of the present disclosure. Further, even if working effects obtained based on configurations of the present disclosure are not explicitly described in the description of embodiments of the present disclosure, effects predictable based on the corresponding configuration have to be recognized.

DESCRIPTION OF SYMBOLS

| | |
|---|---|
| 100: Air conditioner | 110: Indoor unit |
| 120: Outdoor unit | 121: Sensor portion |
| 130: Remote control device | 310: Processor |
| 311: Timer | 320: Sensor portion |
| 321: Temperature measurement sensor | 322: Humidity measurement sensor |
| 323: Airflow measurement sensor | 330: Controller |
| 331: Temperature control portion | 332: Humidity control portion |
| 333: Air volume control portion | 334: Wind direction control portion |
| 340: Communicator | 350: Input unit |
| 360: Display | 370: Storage |

What is claimed is:

1. An air conditioner, comprising:
a sensor portion comprising at least one sensor;
a controller comprising at least one control portion to control a function of the air conditioner; and
at least one processor operatively connected to the sensor portion and the controller, wherein the at least one processor is configured to:
obtain an airflow speed and indoor environmental data through the sensor portion while the air conditioner is operating;
generate a second algorithm by applying the obtained airflow speed, the indoor environmental data, and pre-stored reference data to a first algorithm of predicted mean warm sensation; and
control operation of the air conditioner based on the generated second algorithm, wherein the pre-stored reference data comprises an average value of data regarding an indoor environment felt by each user in a closed space where the air conditioner is not operated, and wherein the second algorithm is an algorithm to variably adjust a value of at least one parameter of the first algorithm, and is closer to an actual comfort of a user than the first algorithm.

2. The air conditioner of claim 1, wherein the indoor environmental data comprises indoor temperature information, indoor humidity information, and radiant temperature information generated while the air conditioner is operating.

3. The air conditioner of claim 1, wherein the data regarding the indoor environment comprises each of indoor temperatures and indoor humidity in the closed space where the air conditioner is not operated, skin temperatures for each user among a plurality of users in the closed space, and values of user subjective properties corresponding to user subjective information.

4. The air conditioner of claim 1, wherein the first algorithm comprises a predicted mean vote (PMV), and wherein the at least one processor is configured to generate the second algorithm by applying a value of at least one of the obtained airflow speed, the indoor environmental data, or the pre-stored reference data to the first algorithm by using at least one model.

5. The air conditioner of claim 4, wherein the at least one model comprises at least one of an artificial neural network (ANN), XGBoost, or random forest.

6. The air conditioner of claim 1, wherein the at least one processor is configured to:
obtain environmental data comprising indoor environmental data of the indoor space where the air conditioner is located, and outdoor environmental data of an outdoor space where the air conditioner is not located; and
compare a value of at least one first parameter of the obtained environmental data with a value of at least one second parameter of the second algorithm.

7. The air conditioner of claim 6, wherein the at least one processor is configured to generate a control signal for at least one of a temperature, humidity, or air volume to minimize a difference between the value of the at least one first parameter and the value of the at least one second parameter.

8. The air conditioner of claim 7, wherein the at least one processor is configured to control the operation of the air conditioner based on the generated control signal for the at least one of the temperature, the humidity, or the air volume.

9. The air conditioner of claim 7, wherein the at least one processor is configured to:
obtain three parameters to correspond the value of the at least one first parameter to the value of the at least one second parameter; and
generate a heat transfer coefficient based on the obtained three parameters and the obtained airflow speed.

10. The air conditioner of claim 9, wherein the at least one processor is configured to:
generate the control signal based on the generated heat transfer coefficient; and
adjust at least one of the temperature, the humidity, or the air volume based on the generated control signal.

11. An apparatus, comprising:
a sensor portion comprising at least one sensor;
a controller comprising at least one control portion to control a function of an air conditioner;
at least one processor; and
a non-transitory memory operatively connected to the sensor portion, the controller, and the at least one processor, wherein the memory is configured to store instructions that, when executed by the at least one processor, cause the apparatus to perform operations comprising:
obtaining an airflow speed and indoor environmental data through the sensor portion while the air conditioner is operating;
generating a second algorithm by applying the obtained airflow speed, the indoor environmental data, and pre-stored reference data to a first algorithm of predicted mean warm sensation; and
controlling operation of the air conditioner based on the generated second algorithm, wherein the pre-stored reference data comprises an average value of data regarding an indoor environment felt by each user in a closed space where the air conditioner is not operated, and wherein the second algorithm is an algorithm to variably adjust a value of at least one parameter of the first algorithm, and is closer to an actual comfort of a user than the first algorithm.

12. The apparatus of claim 11, wherein the first algorithm comprises a predicted mean vote (PMV), and wherein the instructions, when executed by the at least one processor, further cause the apparatus to perform an operation comprising:
generating the second algorithm by applying a value of the at least one of the obtained airflow speed, the indoor environmental data, or the pre-stored reference data to the first algorithm by using at least one model.

13. The apparatus of claim 11, wherein the instructions, when executed by the at least one processor, further cause the apparatus to perform operations comprising:
obtaining environmental data comprising indoor environmental data of the indoor space where the air conditioner is located and outdoor environmental data of an outdoor space where the air conditioner is not located; and comparing a value of at least one first parameter of the obtained environmental data with a value of at least one second parameter of the second algorithm.

14. The apparatus of claim 13, wherein the instructions, when executed by the at least one processor, further cause the apparatus to perform an operation comprising:

generating a control signal for at least one of a temperature, humidity, or air volume to minimize a difference between the value of the at least one first parameter and the value of the at least one second parameter.

15. The apparatus of claim 14, wherein the instructions, when executed by the at least one processor, further cause the apparatus to perform an operation comprising:

controlling the operation of the air conditioner based on the generated control signal for the at least one of the temperature, the humidity, or the air volume.

16. The apparatus of claim 14, wherein the instructions, when executed by the at least one processor, further cause the apparatus to perform operations comprising:

obtaining three parameters to correspond the value of the at least one first parameter to the value of the at least one second parameter; and generating a heat transfer coefficient based on the obtained three parameters and the obtained airflow speed.

17. The apparatus of claim 16, wherein the instructions, when executed by the at least one processor, further cause the apparatus to perform operations comprising:

generating the control signal based on the generated heat transfer coefficient; and adjusting at least one of the temperature, the humidity, or the air volume based on the generated control signal.

18. A method for controlling an air conditioner, the method comprising:

obtaining, by a sensor portion, an airflow speed and indoor environmental data while the air conditioner is operating;

generating a second algorithm by applying the obtained airflow speed, the indoor environmental data, and reference data pre-stored in a storage to a first algorithm of predicted mean warm sensation; and controlling the air conditioner based on the generated second algorithm, wherein the pre-stored reference data comprises an average value of data regarding an indoor environment felt by each user in a closed space where the air conditioner is not operated, and wherein the second algorithm is an algorithm to variably adjust a value of at least one parameter of the first algorithm, and is closer to an actual comfort of a user than the first algorithm.

19. The method of claim 18, comprising:

obtaining environmental data comprising indoor environmental data of the indoor space where the air conditioner is located and outdoor environmental data of an outdoor space where the air conditioner is not located; and comparing a value of at least one first parameter of the obtained environmental data with a value of at least one second parameter of the second algorithm.

20. The method of claim 19, comprising:

generating a control signal for at least one of a temperature, humidity, or air volume to minimize a difference between the value of the at least one first parameter and the value of the at least one second parameter; and controlling the operation of the air conditioner based on the generated control signal for at least one of the temperature, the humidity, or the air volume.

* * * * *